Dec. 29, 1970 R. A. ZOLLER 3,550,246
ROTARY WORM LANCE DIE AND METHOD FOR MAKING
CONTINUOUS WINDLACE CORE STRIP
Filed Sept. 27, 1967 2 Sheets-Sheet 1
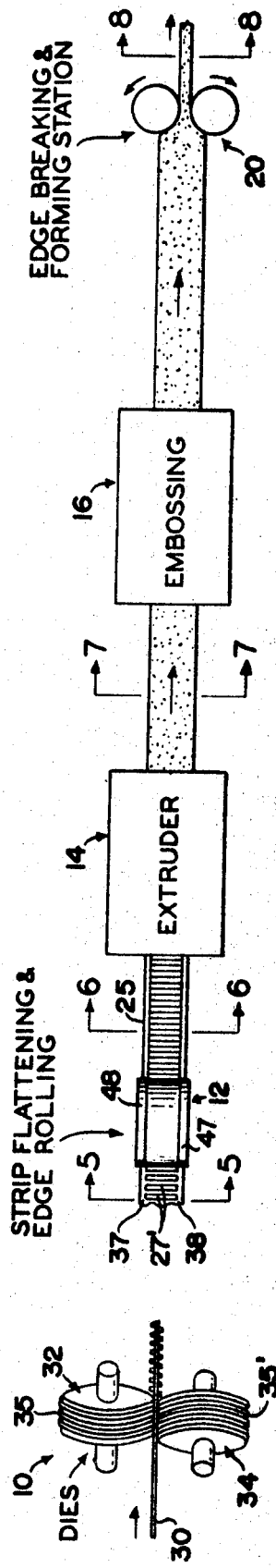
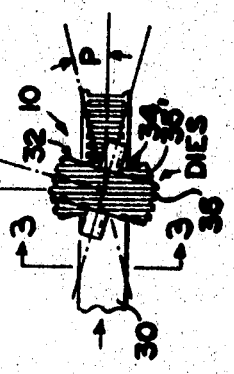
INVENTOR.
ROBERT A. ZOLLER
BY
Meyer, Tilberry & Body
ATTORNEYS.

INVENTOR.
ROBERT A. ZOLLER
BY
Meyer, Tilberry & Body
ATTORNEYS.

United States Patent Office 3,550,246
Patented Dec. 29, 1970

3,550,246
ROTARY WORM LANCE DIE AND METHOD
FOR MAKING CONTINUOUS WINDLACE
CORE STRIP
Robert A. Zoller, Bay Village, Ohio, assignor to The
Standard Products Company, Cleveland, Ohio, a corporation of Ohio
Filed Sept. 27, 1967, Ser. No. 671,086
Int. Cl. B23p 17/00
U.S. Cl. 29—413                                    8 Claims

ABSTRACT OF THE DISCLOSURE

This disclosure pertains to the art of making continuous weather stripping or decorative trimming strip commonly used in the automobile industry. Strip material of this nature is made by applying a covering layer such as plastic onto a flexible steel core, sometimes referred to as windlacing. The steel core or windlacing has a series of transverse, articulated ribs joined at the ends by parallel marginal edges. The windlacing provides a surface on which to secure the plastic covering layer while giving body and shape to the strip in whatever form it may be subsequently used. In particular, the disclosure is of a pair of rotary lancing dies for making continuous windlace core strip wherein each die member is rotatable on a skewed axis with respect to the direction of strip movement and at least one die member has a square helical thread fashioned on its surface which is traced by the other die member cutting through the strip from the opposite side thereby forming the transverse ribs while continuously advancing the strip in the direction of divergence of the die axes.

---

Although the invention will be described with respect to making windlace core strip particularly for decorative trimming used predominately in the automobile industry in which a plastic covering completely encases the core, it will be understood that it has broader applications and may be used as well as lancing any thin strip regardless of how used thereafter.

Heretofore in making windlace core strip a starting strip of thin, flat sheet metal was fed through appropriate reciprocatory dies which provided either (1) a series of transverse slots in the strip formed by the removal of narrow, rectangular cutouts of metal which left transverse ribs connected at the ends by parallel marginal edges; or (2) by transversely slitting the strip leaving parallel marginal edges and then rolling the edges to elongate them which opened up the slits.

In making decorative trimming, the windlace core strip then enters an extrusion apparatus in which the core is completely encased in a plastic covering with the top and bottom layers of plastic firmly bonded together through the opened slits or slots.

Subsequently the marginal edge portions of the windlace core are suitably manipulated such as by flexure during a subsequent forming operation causing them to break through between each rib leaving a series of longitudinally spaced, but wholly unconnected ribs held by the plastic covering.

The trimming strip is bent along its longitudinal axis into a suitable channel shape. Plastic lips, which were extruded on the underneath side of the plastic covering layer, are brought together during the bending operation to provide means for holding the strip in place over an exposed flange which is to be covered by the trimming. A method by which trimming strip of the type described is often made is discharged in U.S. Pat. No. 3,167,856, issued Feb. 2, 1965 to Robert A. Zoller, which application is assigned to the assignee in the present invention.

While the prior practice is capable of producing excellent strip having the required clamping retention properties as well as outstanding flexibility due to the articulated rib structure, the process is not an amenable to full continuous operation as might be desired due to a number of factors.

Chief among these is the fact that when the reciprocatory dies become slightly dull they must be reground inasmuch as the transverse length of the slit or slot is a critical dimension for the subsequent edge breakthrough step. Also, the dies are expensive and prone to breakage which alone amounts to a considerable tooling expense. Moreover, the reciprocatory dies require an intermittant strip feeding motion. Furthermore, due to the straight-line motion perpendicular to the strip which is characteristic of the reciprocatory die, it is incapable of advancing the strip or providing an inherent feeding motion thereto.

These and other difficulties are overcome in the present invention by providing a pair of rotary lancing dies disposed on opposite sides of the strip which are continuously in feeding engagement with the strip and by varying the spacing between the dies it becomes possible to vary the length of lance.

In accordance with the invention a rotary die is provided having a helical female cutting element on its surface adapted to engage on the surface of the strip. A second rotary die member is mounted for rotation on the opposite side of the strip and includes a male cutting element which is adapted to pierce the strip and trace the helical female cutting element of the other die thereby cutting a series of parallel slits through the strip, the slits being disposed relative to the longitudinal axis of the strip in a manner determined by the angle of slope of the helical cutting elements and the relative angular relationship of the die axes and strip axis. Also, means are provided contrasting the strip against lateral movement without impeding the longitudinal feeding movement.

In a preferred embodiment of the invention at least one of the helical cutting elements is a continuous square cut helical thread which is traced by the other cutting element in cutting through the strip from the opposite side.

Further in accordance with the invention, the means constraining lateral movement is a longitudinal guide having spaced parallel walls between which the strip passes which prevent appreciable side movement of the strip in passing through the dies.

Also in accordance with the invention, a method of making continuous windlace core material is provided comprising passing a thin, continuous strip of stock material between a pair of rotary lancing dies mounted on skewed axes diverging in the direction of desired strip movement, continuously lancing a series of transversely extending, closely spaced slits in the strip leaving narrow parallel marginal edges while simultaneously feeding the strip at a speed according to the rotational speed of the dies and guiding the strip through the dies so as to exclude substantially all movement imparted thereto by the dies except in the longitudinal feeding direction.

A principal object of the invention is to provide a rotary worm lance die for making windlace core structures which will be continuous in operation, require a minimum of down time and provide a considerable saving in initial tool costs as well as greatly increasing the number of hours of tool life before regrinding is necessary. Also, regrinding costs of the rotary worm lance are less than encountered with the prior reciprocatory punch and die.

Another object is to provide rotary lancing dies which not only slit the strip at the required interval but also feed it at a linear speed commensurate with subsequent operations such as the extruding of a plastic covering thereon.

A further object is to provide rotary die members, the axes of rotation of which can be spaced to vary the length of lance as accurately as is required to insure trouble free breakthrough of the marginal edges of the windlace core.

Another object is to provide a practical method of continuously making windlace core strip of the type described which eleminates the necessity of periodically shutting down to refurbish the dies.

These and other objects will be more apparent by referring to the following description and drawings wherein:

FIG. 1 is a diagrammatic plan view of a continuous decorative trim strip line, the operations performed therein being schematically represented in sequence from left to right;

FIG. 2 is a side view of the strip line shown in FIG. 1;

FIGS. 1a and 2a are plan and side views respectively of the rotary lancing dies feeding the strip lines of FIGS. 1 and 2;

FIG. 3 is an end view of the rotary lancing dies taken along line 3—3 of FIG. 2a;

FIGS. 4–6 are segments of strip showing the development of the windlace core taken at various places in the line;

FIG. 6a is a modified windlace core structure showing edge notching to facilitate edge breakthrough;

Figure 9:
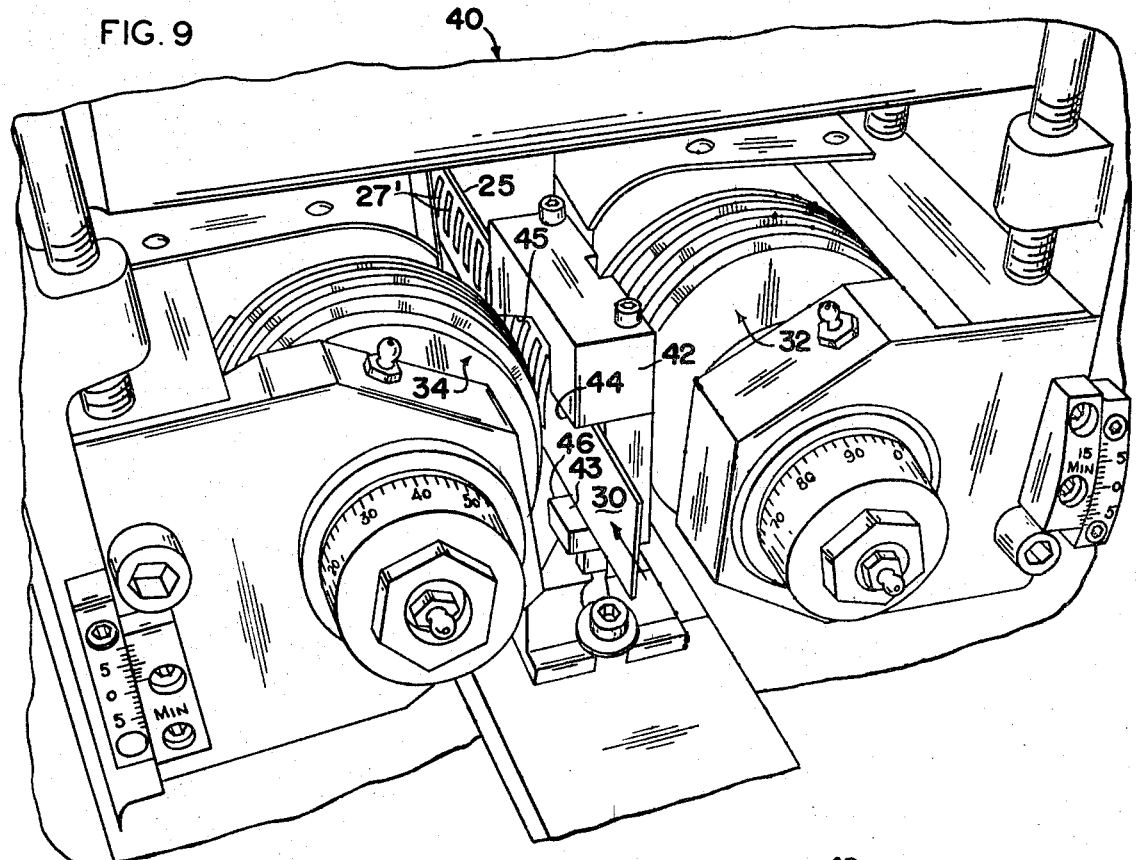
Figure 10:
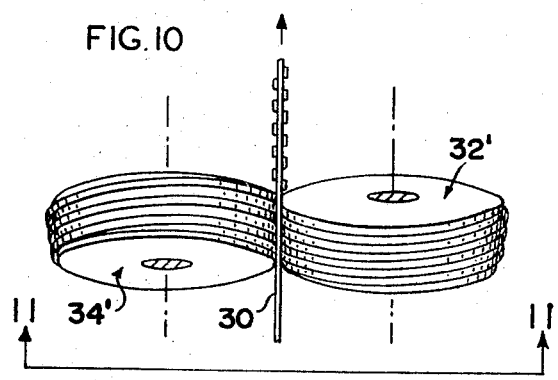
Figure 11:
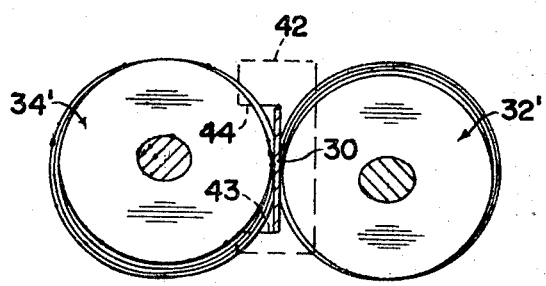
Figure 12:
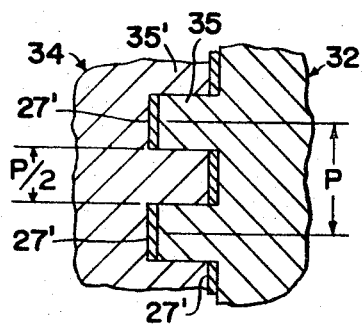

FIGS. 7 and 8 show the decorative trim strip with its plastic covering and windlace core taken along lines 7 and 8 of FIG. 1;

FIG. 9 is a pictorial view of the rotary worm lancing dies showing the longitudinal strip guide;

FIGS. 10, 11 show a modification of the rotary worm lancing dies in which the dies are tapered; and FIG. 12 is an enlargement of the square thread of the dies showing the cutting profile.

Referring now to the drawings wherein the showings are for the purpose of illustrating a preferred embodiment of the invention only and not for the purpose of limiting same, in FIG. 1 a continuous line for making decorative trim strip (FIG. 8) is shown comprising, in accordance with the invention, rotary worm lancing dies 10, strip flattening and edge rolling rolls 12, an extruder 14, an embossing station 16, and edge breaking and forming device 20. The method for making the finished trim strip 22 includes, insofar as this invention is concerned, the lancing, feeding and rolling of the windlace core strip 25 which portion of the process will be described hereinafter in more detail, however, it should be understood that the invention is not limited to making any particularly finished product such as the trim strip 22 shown in FIG. 8, but rather to the making of any continuously lanced strip of the general form as shown in FIGS. 5, 6, 6a. For the purposes of description, finished trim strip 22 is channel-shaped in cross-section having a crown portion 21 of arched form and a pair of sidewalls 23, 24 which are inwardly inclined from the crown portion. A resilient core 25 made up of a series of disconnected steel ribs 27 is encased within a plastic covering 28. Therefore, the core 25 consists of a series of transversely extending, closely spaced ribs 27 free of any connection to one another. The ribs 27 provide maximum flexibility lengthwise but with sufficient combined rigidity to prevent spreading of the sidewalls 23, 24 for good clamping retention of the lips 29.

The core 25 begins as a thin, flat, steel strip 30 which is passed between the pair of rotary lancing dies 10. In accordance with the invention, helically formed male and female cutting elements are formed on the surfaces of dies 10 and during rotation, the male cutting element pierces the strip at regular intervals in tracing the female cutting element on the opposite side so as to form a series of parallel slits as described more in detail hereinafter. In the preferred embodiment of the invention at least one of the dies 10 has a helical thread fashioned on its surface. Preferably, the helical thread is a single continuous square cut thread in which the lead is equal to the pitch. That is, the distance the thread would advance axially in one turn is equal to the distance from a point on the thread to a corresponding point on the next thread measured parallel to the axis. However, the die may have double or triple threads which are composed of two or three separate threads running side by side in which the lead is twice or three times the pitch.

Moreover, the thread pitch P, or axial distance from a point on one thread to the corresponding point on the next adjacent thread, should be equal to twice the intended spacing between slits (FIG. 12).

It is also possible to vary the shape of thread from a standard square to any number of shapes such as a worm thread in which the cross-sectional profile is one in which the thread sides are at some angle from vertical; or a buttress thread in which one side is vertical and the other inclined. Or the depth and width of the thread may be varied in certain cases. It is also contemplated by the invention that if one die has a helical thread the other may take a different form, i.e., it may not have a helical thread on its surface, but instead be in the form of a rotary member carrying piercing elements which are capable of cutting through the strip and tracing or meshing which the helical thread of the other die.

Or instead of a thread, a series of indentations formed in a helical path may serve as the female cutting element while the male cutting element is in the form of a series of piercing elements.

It is also a significant aspect of the invention that the rotational axis of each die is inclined to the longitudinal axis of the strip 30 by an angle approximately equal to the angle of slop $p$ (FIG. 2a) of the helical cutting element so that in the case of a thread, the plane generally containing the thread sidewall extends transversely to the axis of the strip. More particularly, the rotational axis of each rotary lancing die 10 is inclined equally by an angle P, but in opposite directions relative to the strip axis and preferably lies in a plane parallel to the plane of the strip 30 (FIG. 1a). Also important is that the dies 10 rotate in the same direction about their rotational axes (FIG. 3). One die can be rotated faster than the other but preferably they will have the same angular velocity compatible with the desired linear speed of the strip 30.

In accordance with the preferred embodiment of the invention each rotary die 32, 34 has a square cut helical thread 35, 35' fashioned on its surface which is in continuous rotational engagement with the thread of the die on the opposite side by cutting through the strip 30. In the process of cutting through the strip 30 (FIG. 12) a series of transversely parallel, alternately bowed ribs 27' are formed leaving parallel marginal edges 37, 38 (FIG. 5) along each side. Inasmuch as the threads 35, 35' are meshed in the plane of the strip, the length of lance and thus the width of the marginal edges 37, 38 is controlled by the spacing of the rotational axis of each die 32, 34. This is a critical characteristic of windlace core in obtaining uniform edge breakthrough as described hereinafter.

Referring now to FIG. 9, a pictorial view shows the rotary worm lancing dies 32, 34 mounted in an adjustable head 40 similar to that used in a standard screw thread machine. Appropriate adjustments are provided for changing the die spacing and inclination. The strip 30 is passed between the dies 32, 34 and in the direction indicated by the arrow. In accordance with an important aspect of the invention, a longitudinal guide block 42 includes parallel sidewalls 43, 44 spaced approximately the width of the strip 30 being passed therebetween. Cutouts 45, 46 allow the dies 32, 34 to be adjusted without interfering with the guide blocks 42. The guide block sidewalls 43, 44 prevent any lateral movement of the strip 30 in passing through the dies 32, 34 although without inhibiting the longitudinal feeding motion imparted to the strip by the rotary lancing action of the dies.

It should be appreciated that the invention is not necessarily limited by the preferred embodiment illustrated in FIG. 9 and that if desired the guide block 42 may be eliminated entirely and appropriate longitudinal guiding of the strip provided by maintaining it under tension sufficient to prevent lateral movement; or it may be provided that instead of the rotary lancing dies of cylindrical form, they are tapered as shown in the modification of FIGS. 10, 11 in which the meshed dies 32', 34' are tapered in the direction of strip feed; or as discussed previously, one of the rotary dies may take another form entirely or have a different shaped thread without departing from the invention; or the axis of rotation of the threaded die may be parallel to the axis of the strip for placing slits therein inclined to the longitudinal axis by the slope angle of the thread, it being important only that one of the dies have a helical die cutting element which is traced by a piercing element cutting through the strip from the opposite side.

Referring again to FIGS. 1, 1a, 2, 2a as the strip 30 leaves the dies 32, 34, it has the characteristic windlace core structure (FIG. 5) of a plurality of transversely parallel ribs 27' bounded at each end by longitudinally extending, marginal edges 37, 38. Fed in a vertical position by the dies 32, 34, the windlace core 25 is then oriented to pass horizontally through the rolls 12 and the bowed ribs 27' are flattened (FIG. 6). The rolls 12 have marginal ridges 47, 48 which reduce the thickness of the ribs 27'. Upon leaving the rolls 12 the edges 37', 38' are elongated thereby uniformly spacing the ribs 27' and opening up the transversely parallel slits to form gaps 49 therebetween. The marginal edges 37', 38' are rolled so as to slightly overlap the ends of the gaps 49 and being thinner than the rest of the strip, are prone to breaking through opposite each gap 49 upon appropriate manipulations. It may be desirable that the rolls 12 also provide a lance 50 opposite the transverse gaps 49 in the marginal edges 37', 38' as shown for example, in the modification in FIG. 6a to facilitate edge breakthrough.

After the windlace core 25 leaves the rolls 12 it enters the extruder 14 where the plastic covering 28 complete with lips 29 is applied. Subsequently, before the covering 28 has completely cooled, the upper surface is usually embossed at 16 to give the appearance of a fabric or texturized surface lending to the decorative aspects of the trim strip.

Finally, the windlace core 25 with its plastic covering 28 is bent and manipulated in an edge breaking and forming device 20 in such fashion that the marginal edges 37', 38' are broken through so that each rib 27' is wholly unconnected as the finished trim strip leaves device 20 and is thereafter wound on a coil for distribution.

Having thus described a preferred embodiment of the invention it will be appreciated by those skilled in the art that modifications coming within the scope of the invention may be employed, however, it is intended that such modifications be covered by the invention as defined in the appended claims except insofar as limited by the prior art.

Having thus described my invention, I claim:

1. A lancing die for cutting a series of parallel slits in a thin strip comprising
    a rotary die having a helical cutting element fashioned on its surface;
    a second rotary die cooperatively opposed thereto and carrying a cutting element for cutting through the strip from the opposite side to trace said helical cutting element in forming said parallel slits, the axis of each of said dies being disposed at an angle relative to the longitudinal axis of the strip; and
    means constraining the strip against lateral movement without impeding a longitudinal feeding movement imparted thereto by said rotary die.

2. A lancing die according to claim 1 wherein the rotational axis of each said die is disposed at an angle in opposite directions relative to the longitudinal axis of the strip in a manner determined by the angle of slope of the helical cutting element so that the slits are formed transversely of the strip axis.

3. A lancing die according to claim 1 wherein said helical cutting element is a thread on the surface of one of said dies.

4. A lancing die according to claim 3 wherein each said rotary die has a square helical thread thereon which meshes with the thread on the other die in cutting through the strip.

5. A lancing die according to claim 4 wherein the spacing of said rotary dies is sufficient to leave parallel marginal edges on said strip.

6. A lancing die according to claim 1 wherein said means constraining the strip against lateral movement comprises a guide member having spaced parallel walls between which the strip is adapted to pass.

7. A lancing die according to claim 1 in which one rotary die is tapered having a helical thread increasing in diameter in the direction of strip feed.

8. A method of making continuous windlace core from a thin strip comprising the steps of
    inclining the rotational axes of a pair of rotary lancing dies so that the rotational axes diverge in the direction of desired strip movement,
    passing a thin strip of stock material between the pair of rotary lancing dies,
    continuously lancing a series of transversely parallel slits in the strip leaving narrow marginal longitudinal edges while simultaneously advancing said strip by the rotation of said dies,
    guiding the strip through the dies so as to exclude all movement imparted thereto by the dies except the component in the longitudinal feeding direction.

References Cited

UNITED STATES PATENTS

| | | | |
|---|---|---|---|
| 3,172,320 | 3/1965 | Talbot | 83—342 |
| 3,222,769 | 12/1965 | Le Plae | 29—413 |
| 3,446,049 | 5/1969 | Greis | 83—345 |

JOHN F. CAMPBELL, Primary Examiner

R. J. CRAIG, Assistant Examiner

U.S. Cl. X.R.

29—6.1, 163.5; 72—186; 83—56, 340, 342